(12) United States Patent
Varga et al.

(10) Patent No.: US 12,373,934 B2
(45) Date of Patent: *Jul. 29, 2025

(54) IMAGE ANALYSIS SYSTEM FOR TESTING IN MANUFACTURING

(71) Applicant: Bright Machines, Inc., San Francisco, CA (US)

(72) Inventors: Melinda Varga, Seattle, WA (US); Konstantinos Boulis, Redmond, WA (US); Oytun Akman, Oakland, CA (US); Julio Soldevilla Estrada, Seattle, WA (US); Brian Philip Mathews, Burlingame, CA (US)

(73) Assignee: Bright Machines, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/761,172

(22) Filed: Jul. 1, 2024

(65) Prior Publication Data

US 2024/0354931 A1   Oct. 24, 2024

Related U.S. Application Data

(63) Continuation of application No. 18/449,610, filed on Aug. 14, 2023, now Pat. No. 12,026,865, which is a
(Continued)

(51) Int. Cl.
*G06T 7/00* (2017.01)
*G06T 1/20* (2006.01)
(Continued)

(52) U.S. Cl.
CPC .............. *G06T 7/0004* (2013.01); *G06T 1/20* (2013.01); *G06T 7/001* (2013.01); *G06V 10/809* (2022.01);
(Continued)

(58) Field of Classification Search
CPC . G06T 7/001; G06T 1/20; G06T 2207/10116; G06T 2207/20084;
(Continued)

(56) References Cited

U.S. PATENT DOCUMENTS 7,359,544 B2   4/2008   Gao et al.
8,572,013 B1   10/2013  Nash et al.
(Continued)

FOREIGN PATENT DOCUMENTS

WO   2019/171125 A1   9/2019

OTHER PUBLICATIONS

International Search Report and Written Opinion, PCT App. No. PCT/US2020/070777, Feb. 24, 2021, 9 pages.
(Continued)

*Primary Examiner* — Christopher Wait
(74) *Attorney, Agent, or Firm* — Nicholson De Vos Webster & Elliott LLP; Judith Szepesi

(57) ABSTRACT

A vision analytics and validation (VAV) system for providing an improved inspection of robotic assembly, the VAV system comprising a trained neural network three-way classifier, to classify each component as good, bad, or do not know, and an operator station configured to enable an operator to review an output of the trained neural network, and to determine whether a board including one or more "bad" or a "do not know" classified components passes review and is classified as good, or fails review and is classified as bad. In one embodiment, a retraining trigger to utilize the output of the operator station to train the trained neural network, based on the determination received from the operator station.

20 Claims, 11 Drawing Sheets

Related U.S. Application Data continuation of application No. 16/949,752, filed on Nov. 12, 2020, now Pat. No. 11,727,553.

(60) Provisional application No. 62/934,397, filed on Nov. 12, 2019.

(51) Int. Cl.
  *G06V 10/80* (2022.01)
  *G06V 10/82* (2022.01)
  *G06V 30/19* (2022.01)
  *G06V 30/24* (2022.01)

(52) U.S. Cl.
  CPC ........ *G06V 10/82* (2022.01); *G06V 30/19113* (2022.01); *G06V 30/248* (2022.01); *G06T 2207/10116* (2013.01); *G06T 2207/20084* (2013.01)

(58) Field of Classification Search
  CPC . G06T 2207/20081; G06T 2207/20092; G06T 2207/30141; G06T 7/0004; G06N 3/08; G06N 3/0454; G06V 10/809; G06V 10/82; G06V 30/19113; G06V 30/248; G06K 9/6292; G06K 9/6227
  See application file for complete search history.

(56) References Cited

U.S. PATENT DOCUMENTS

| | | |
|---|---|---|
| 9,778,206 B2 | 10/2017 | Honda et al. |
| 10,043,264 B2 | 8/2018 | Greenberg et al. |
| 10,115,040 B2 | 10/2018 | Brauer |
| 10,586,318 B2 | 3/2020 | Stone et al. |
| 10,596,698 B2 | 3/2020 | Oota et al. |
| 10,636,133 B2 | 4/2020 | Chang et al. |
| 2004/0156540 A1 | 8/2004 | Gao et al. |
| 2013/0202189 A1 | 8/2013 | Shibuya et al. |
| 2015/0081599 A1 | 3/2015 | Dobler |
| 2017/0082555 A1 | 3/2017 | He et al. |
| 2018/0293722 A1 | 10/2018 | Crocco et al. |
| 2020/0226742 A1 | 7/2020 | Sawlani et al. |
| 2020/0250801 A1 | 8/2020 | He |
| 2020/0364841 A1* | 11/2020 | Hino .................. G06T 7/001 |
| 2020/0364906 A1 | 11/2020 | Shimodaira |

OTHER PUBLICATIONS

Non-Final Office Action, U.S. Appl. No. 16/949,752, Dec. 8, 2022, 18 pages.
Notice of Allowance, U.S. Appl. No. 16/949,752, Mar. 27, 2023, 12 pages.
Notice of Allowance, U.S. Appl. No. 18/449,610, Mar. 1, 2024, 12 pages.

* cited by examiner

IMAGE ANALYSIS SYSTEM FOR TESTING IN MANUFACTURING

RELATED APPLICATION

The present application is a continuation of U.S. patent application Ser. No. 18/449,610, filed Aug. 14, 2023, issuing as U.S. Pat. No. 12,026,865 on Jul. 2, 2024, which application is a continuation of U.S. patent application Ser. No. 16/949,752, filed Nov. 12, 2020, issued as U.S. Pat. No. 11,727,553 on Aug. 15, 2023, which application claims priority to U.S. Provisional Application 62/934,397, filed on Nov. 12, 2019, all of which applications are incorporated herein in their entirety.

FIELD

The present invention relates to optical analysis, and more particularly to image classification in automated manufacturing or inspection.

BACKGROUND

In a current production environment, highly perfected automated optical inspection (AOI) algorithms can fail approximately 3-15% of boards. For example, an AOI machine may analyze all components on a surface mount technology (SMT) board, which can include in the range of 1,000 to 10,000+ classifications. A board is deemed "Not Ok" if one or more classifications fail. All failed boards require verification by a human operator, and it is historically estimated that in some configurations 98% of the fails are deemed to be false calls by the operator. This high false call rate by the AOI machine takes time and manpower to handle. Additionally, on prototype lines or lines where new products are being introduced, where only a few hundred units are manufactured of a given product AOI will fail 100% of the boards because AOI classification rules are not fine-tuned enough, leaving the operators to check whether the boards are properly assembled.

In general, Automated Optical Inspection training starts with a "gold" printed circuit board (PCB) or printed circuit board assembly (PCBA) that is used to train component models for all component shapes. These models will be used to determine whether a component is properly mounted onto the PCBA board. Variations in component appearance (such as from manufacturing variation), lighting, background color and soldering profile will often induce a machine to falsely identify a component as "bad" and thus fail inspection, because these variations in appearance may violate one of the human specified classification rules even for a "good" board. Over time the operator may manually tune the classification rules to more correctly classify what component appearances are "good" vs. "bad", but the volume of rules and component types is large, causing high labor costs and opportunity for human error.

Each component shape has a unique inspection algorithm (Macro/Sub-mode/Window) with varying illuminations. Algorithms are utilized to determine Presence, Position, OCR/OCV, Solder and Drawbridge conditions, for example.

There are many possible failure modes for every type of component, including chip components. The AOI machine utilizes separate routines to check each of these failure modes. To this end, vision models must be trained individually, which requires time and manpower. In production, if one of these tests fails for one of the components failure modes, then the entire board is classified as a "failed unit".

FIG. 1 shows the prior art workflow of the inspection process for an AOI machine. If the AOI machine deems a board to be good, because every component passes its corresponding set of classification rules, it will be designated as a "verified pass" and will go to the next assembly step without any human interaction. If the machine finds at least one component that does not pass its corresponding classification rules, the board will be routed to an operator station for review by a human operator. This step could take from seconds to minutes to complete, depending on the number of components flagged. If the operator finds the board to be good, marking that it passes review, it will be sent to the next assembly step. During the new product introduction phase, the operator may choose to better tune the classification rule to prevent future false-positives at the risk of introducing new "false negatives". However, the process to update classification rules is expensive and there are diminishing returns given the thousands of component types and large number of rules for each. At some point during production ramp-up it becomes less common for classification rules to be changed as the rules are deemed "good enough" and balance false-positives against false-negatives. The result is that humans often have to review a large number of boards (3% to 15% is common). If the operator review fails the board, indicating a defect, it may be passed for repair.

On high-volume SMT production line building 1000 units per day, typically the AOI machine inspection tags at least one component as bad in 5% of the boards, meaning that 50 boards must be manually reviewed every day. Statistically, 99% of these "bad" calls are incorrect, and the board is passed after manual review.

On a new product introduction (NPI) PCBA production lines that are building less than 100 units per week, machine inspection results are expected to have a nearly 100% failure rate, i.e. all boards require manual inspection because the AOI classification rules have not been sufficiently tuned, and there are not enough examples, to handle small batch production, and its attendant variations.

Thus, the existing AOI and other inspection systems require significant manual intervention and have an extremely high false positive rate.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
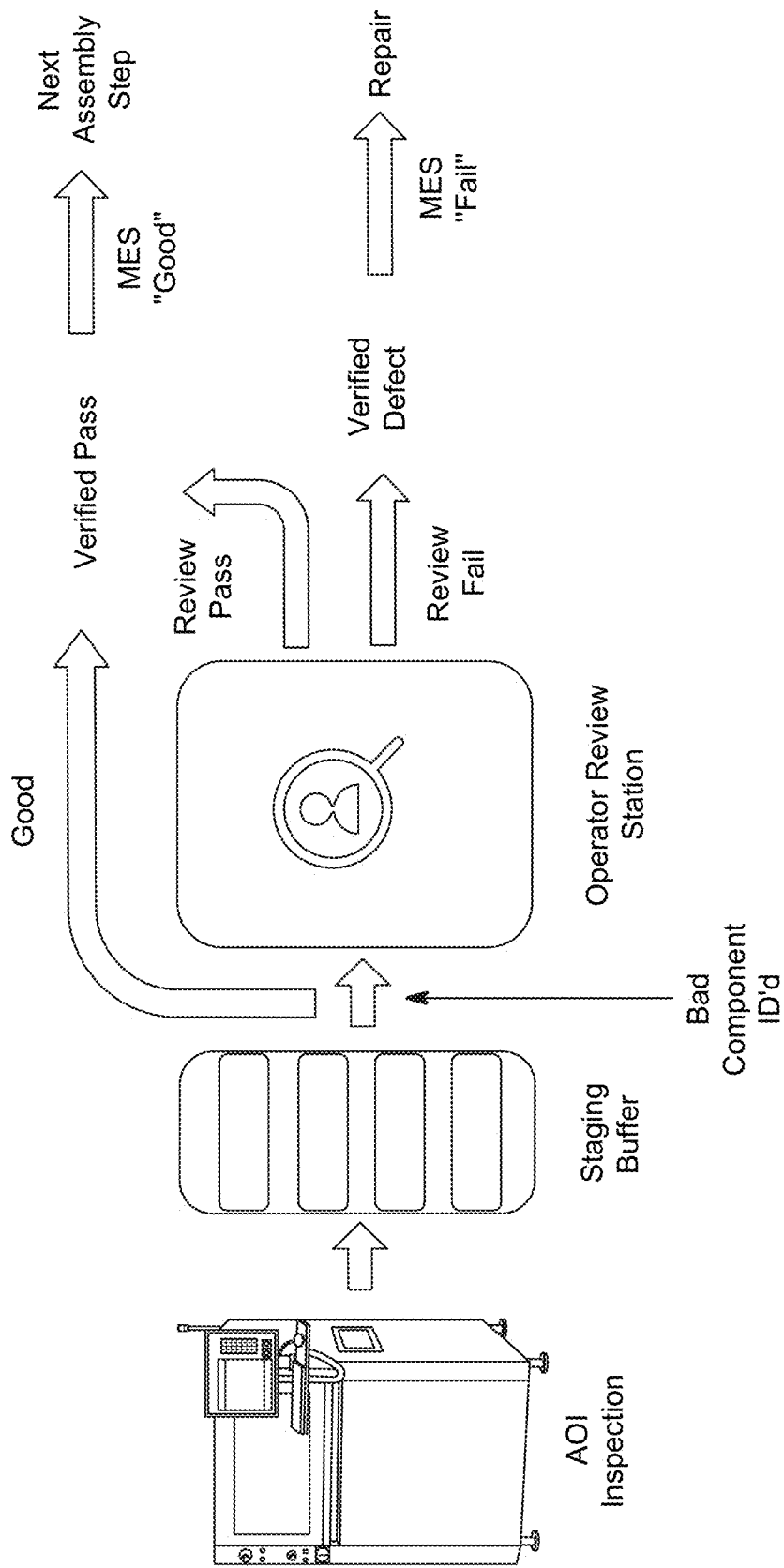
FIG. 1 shows the prior art workflow of the inspection process.

Inspection systems, including automated optical inspection (AOI), AXI (automated X-ray inspection), SPI (solder paste inspection) and final visual inspection are part of manufacturing processes. Such machines have high rate of false positives, i.e. flagging an assembly as bad although it is actually good. It is also possible that they have false negatives, i.e. flagging an assembly as good although it is actually bad. The preference is generally set to reject boards if there is any question. In part, this is because false negatives can be more problematic than false positives because there is no manual inspection in the former case and the last opportunity to detect these bad assemblies would be the in-circuit test (ICT) at the end of the line when it is already too late, because the elements on the bad board cannot be easily reused. Thus, the system is set to prefer false positives (erroneously rejecting a good board) over false negatives (erroneously passing a bad board). However, even small false negative rates can amount to many bad devices being passed. Furthermore, there is a trade-off between human effort required to sufficiently define effective classification rules for hundreds of components, each with their own normal manufacturing variances and the effort required to manually validate boards rejected by the automated system.

As an example, assuming a production line where the inspection systems flag 5% of the assemblies as bad, and 99% of the cases flagged as bad are actually good, and 0.1% of the cases flagged as good are actually bad. In a batch of 20K cases, there will be 20K*0.95*0.001=19 bad cases that were passed, while there would be 20K*0.05*0.01=10 bad cases that were detected through AOI+manual detection. This means that the system is missing almost ⅔ of all bad cases. Understanding the false negative rates is crucial to the quality of a production line.

The present system is an advanced Vision Analytics and Validation system (VAV). The VAV is designed to reduce the percentage of false negatives, and false positives, to make inspection more accurate. The VAV's use can extend to identifying potential new defects that were previously unseen, and either recognize them as good, or flag them as unknown, or suspicious. This reduces the need to provide a large number of examples for each defect type to train the machine learning system.

Additionally, in one embodiment, by providing an analytics platform as part of the VAV system, when the VAV decisions have a reduced accuracy, it can be rapidly identified. Instead of waiting for hours or days so that human operators detect that AOI production decisions are of poor quality, or that quality has decreased, the system can immediately detect the change by noticing unusual patterns of detections that correlate with poor detection accuracy. Faster identification of such issues leads to faster remediation, and fewer bad boards passed by the system. This enables the fast detection of drift in classification accuracy. Because data is being collected from the line, that data can be used to retrain a model that is better suited for the current conditions. Additionally, in one embodiment, the machine learning system may be rewound to a prior state if the system identifies a change in the detection accuracy.

Prior to releasing an inspection program to production assembly environment, in the current art, the algorithms need to be trained to measure various patterns for each component's characteristics. In the prior art, this methodology is a highly supervised process (every step needs an expert's inputs) and is very slow to adapt to new conditions, especially when new components are used, as in new product introduction (NPI) processes. If a new inspection algorithm or set of classification rules is needed for a component, an expert has to identify the areas of the image to concentrate on, what threshold values need to be set, etc. And after the algorithm is put in production, when the lightning conditions change even a little, or when the properties of the components change in a way that does not affect performance (such as manufacturing variation in plastic coloring) the algorithm might start failing good components. Additionally, many measurements need to be run for each component, and for every failure mode.

In one embodiment, a deep convolutional neuronal network (CNN) is used to improve this process. Classification tasks are one of the pivotal use cases of CNNs. The advantage of these networks is that they do not require the user to engineer features that the model uses to categorize the images. Rather, building these models is a weakly supervised process. The inputs to the model are a set of labeled images, the initial labels for the images, indicating whether they are good or bad, and optionally the type of problem they indicate, need to be assigned by the experts. But experts do not need to spend time on defining regions of interest and threshold values. The CNN will construct the features that best reflect what class the images belong to, based on what data it is presented with. Given enough data, these methods are very accurate. It is also possible to extend the classification to recognize a new type of defect, one only needs to provide enough examples of the new defect and retrain the classifier. To speed up the training process, one can use architectures that are pretrained on millions of images that belong to 1000 s of classes, which cuts down the training time significantly.

The reasons listed above make CNNs prime candidates to be used as a powerful tool to reduce the AOI machines' false call rate.

In one embodiment, when presented with an image of a board the model will return two numbers, the probability that the image is a "bad" one, and the probability that the image is a "good" one. These two numbers add up to one, and in one embodiment the default category the image will be assigned to is the class that has a higher probability. In some cases, these two probabilities could be really close to each other. For example, these probabilities can be: "good" with a 0.51 probability and "bad" with a 0.49 probability. In this case, in general, the image would be classified as good, but with a little change in the training it just as easily could have been classified as bad. To mitigate this effect, in one embodiment, the decision of the classifier is only accepted when the probability of the predicted class is at least 0.95, indicating that the system is very confident in its prediction. Effectively the threshold of the classifier is changed from 0.5 to 0.95.

The threshold change prompted the introduction of a third class: "Do not know", since if neither of the probabilities reaches the 0.95 threshold value, the images will not be classified into either one of the classes. As a result, images that the classifier is not confident enough to classify to be either "good" or "bad" are classified into a "Do not know"

class. Thus, the updated classifier classifies boards into good, bad, and do-not-know. Although a probability of 95% is used to classify a board as either good or bad, in experimental assessments only a few boards were classified as "do not know."

In one embodiment, the system does not separate out component by component type. Nor are component shape values taken into account. Instead a machine learning system is trained to locate and evaluate only the relevant aspect.

For example, for solder evaluations, an ML system may focus solely on solder joints between component leads (wires) and PCB solder pads. This can be accomplished in a variety of ways, such as a stacked ML system where one ML pre-processing component identifies solder joints (regions of interest) and masks other regions (regions not of interest), and where a secondary ML system evaluates the quality of the localized solder joints (good vs. bad vs. unsure). A stacked ML system might also include an ML classifier that looks at the component shape and identifying features (text, barcodes, color bands, etc.) to make sure that the correct components are installed at the correct locations and orientations. In this embodiment, the system in one embodiment can separate the part of the ML stack that evaluates solder joints such that it isn't dependent on the specific PCBA being evaluated. In fact, training data from any circuit board could be used for all future circuit boards. While evaluation for correct component type at the correct orientation on the board would require board-specific training, most of the other evaluations of the PCBA can be carried across a variety of boards and components.

This permits the aggregation of training data over all types of components. In traditional systems, when the shape of any element on a board is changed, or a component is moved, the system needs to be retrained, because the training is based on an identification of the component and its surroundings. However, in one embodiment, the present CNN system is trained to be shape independent in evaluating some aspects of the PCBA. For example, the inspection of solder joints may be made component shape independent. In one embodiment, the system may include another ML system to evaluate that the correct component was located in the correct location. This may be based on an evaluation of the component shape and/or identifying data such as written text codes or barcodes or color bands on the components. Making at least some of the evaluation component shape independent is useful because many components come in a variety of sizes and it is quite frequent that in a single design multiple elements have multiple size configurations.

There are a number of different problems that a "stacked" ML system can solve:
Find solder joints (using CAD or visual)
Evaluate/inspect/classify solder joints
Find components
Inspect components for placement and orientation and proper assembly
Inspect components for type and appearance and part number, etc.
Inspect the board itself: type, orientation, required features such as holes, bar codes, solder mask, pads, etc. etc.

In one embodiment, the present VAV system may include separate stacked ML systems for each of the 6 inspection types. Some of these items (like finding and inspecting solder joints, and finding components on the PCBA) can be board-independent. This means that once the system is trained on how to find and evaluate solder joints, no additional training or retraining is needed for the system to evaluate new boards that have different components or layouts. There are other steps that are by definition board-specific (#4, part of #5, #6). In one embodiment, the system can have two different types of board-specific training: training utilizing tagged real example images (traditional ML), and training utilizing CAD (computer aided design) files. The system, in one embodiment, may use CAD files to create synthetic images of PCBA's rendered from CAD data. The system may create synthetic images of "good" and "bad" boards, with appropriate tags, and use these synthetic images to train ML.

In one embodiment, a 34-layer convolutional neuronal network may be used. In one embodiment, last few layers of such a network may be retrained using the images of elements to adapt it to the task of classifying images into the "good" and "bad" categories.

By introducing the "Do not know" class the operator's expertise is channeled into cases that are really challenging. Instead of hitting the accept button 95% of the times, an operator will get a more balanced sample of images that need his or her expertise to be classified correctly.

Even if the processing is set up such that the operator will have to check all images in the "Do not know" category and all images that are classified "bad," they would only have to check a small fraction of the total data set. In this case, most images will be bad so the operator will be primed to choose that option. But since repairing a board will take much more time and manpower, they will be required to inspect every sample thoroughly to pick out the good boards.

Advantages of the System

This approach can quickly adapt to new defects, new lighting conditions, and new parts without requiring any handcrafting or tuning of features. The only information that is needed is the labeling of training images as good or bad by human experts which is normally done as part of production. This information can also be used to regularly retrain the model and adapt to changing conditions.

If the model stops being highly accurate, it will be quickly identified, since the model tracks the number of "Do not know" decisions, total number of decisions and number of "good" labels as marked by human experts. This also enables a rapid response, adjustment, reversion of changes, or retraining, if the classifier accuracy drops.

In this experiment, the purpose was to be able to detect whether a resistor or a capacitor is present in the images and to locate the pads (bases) they are supposed to be placed on, and that the solder joints between the component and the pads was acceptable. Using the information obtained from this recognition, the system can verify that the part (capacitor or resistor) is placed correctly, and is the correct type of part. Ultimately, the goal of using these systems is to be able to recognize if a part is missing or tilted, if the pads or the part itself appear to be damaged or if there is a miscalibration in the pictures taken of the board (only a portion of the part is shown in the picture). These algorithms can complement the results obtained from the good/bad classifier and allow us to improve the error detection of the AOI machine. This technique of course can be applied to any other element on a board, whether resistor/capacitor, heat sink, processor, or anything else. The improved technique described will speed up the assessment of a board, make operator review more useful, and reduce the number of bad boards passed, and good boards failed.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 2:
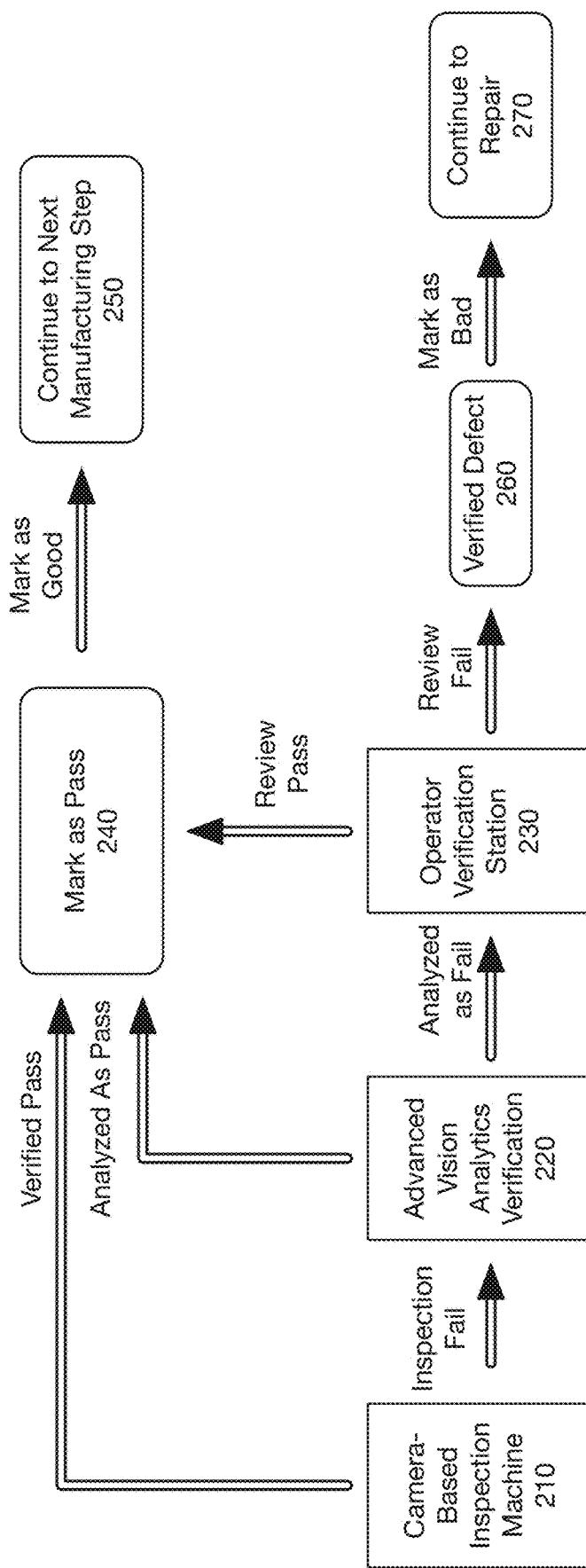
FIG. 2 is a block diagram illustrating one embodiment of the workflow.

FIG. 2 is a block diagram illustrating one embodiment of the workflow of the present system. The camera-based inspection machine 210 obtains one or more pictures of the board. In one embodiment, the camera-based inspection machine 210 may be an AOI (automatic optical inspection) machine, an AXI (automatic x-ray inspection machine), an SPI (solder paste inspection machine), or another machine which utilizes visual inspection.

The output of the camera-based inspection machine 210 is either a "pass" indicating that the board has no detected classification rule violations (errors), or a "fail" indicating that the system has at least one classification rule violation (error). As noted above, the vast majority of the boards failed by the camera-based inspection machine 210 are actually good, as classified by an operator.

In one embodiment, failed boards go to an advanced vision analytics verification (VAV) system 220. The VAV system 220 utilizes the image data from the camera-based inspection machine 210, and provides advanced analysis, as will be described below. If the VAV system 220 determines that the boards pass, they are analyzed as pass, and passed to the next step, via block 240.

If the VAV system 220 classifies the board as "bad" or "do not know," it is marked as analyzed fail, and passed to an operator verification station 230. If the operator marks them as pass, they are marked "review passed", and passed to the next step via block 240. If they are reviewed as a "failed", they are tagged as a verified defect, and marked "bad". They may then be sent on to repair 270, discarded, or handled in some other way.

Figure 3:
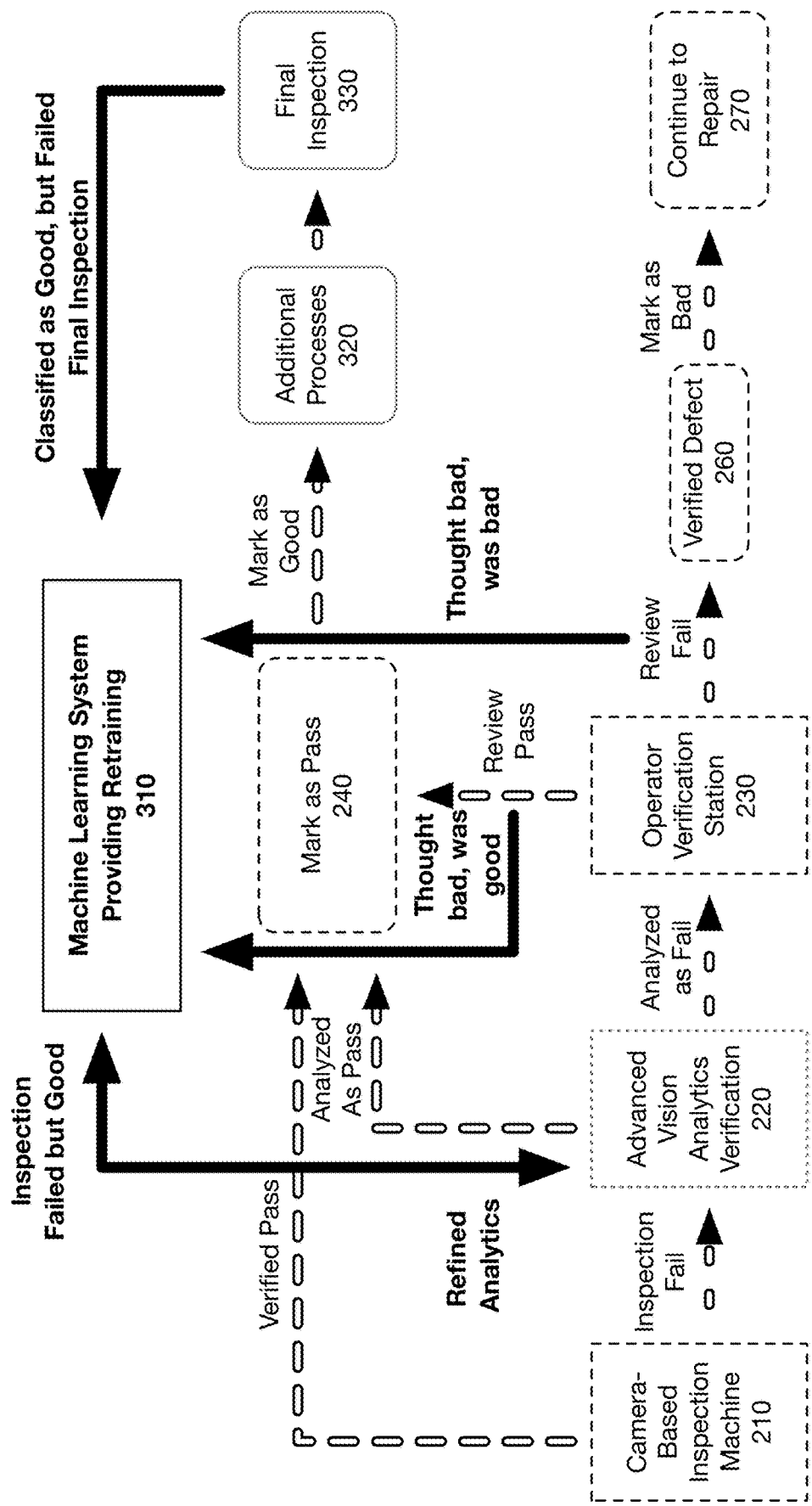
FIG. 3 is a block diagram illustrating one embodiment of the workflow with a retraining system.

FIG. 3 is a block diagram illustrating one embodiment of the workflow with a retraining system. The diagram illustrates the same system as that of FIG. 2, with an additional machine learning system 310 including retraining. The VAV system 220 in one embodiment uses a convolutional neural network (CNN) trained by machine learning system 310. In one embodiment, the CNN 310 may encompass a plurality of separate machine learning. In one embodiment, the CNN implements a "stacked" ML system. In one embodiment, there may be separate "stacked" ML systems for each type of inspection. For example, the inspection types may include: identifying components, verifying component placement/orientation/assembly, identifying component type and verifying appearance, inspecting solder joints, etc.

The CNN 310 in one embodiment is continuously or periodically retrained as well. The VAV system 220 passes data about boards which were failed by the camera-based inspection machine 210 but analyzed as good by the VAV system 220 to the machine learning system 310. Additionally, the operator's classification of the boards analyzed as fail are also fed back into the machine learning system 310. In one embodiment, the final inspection results of boards which were marked as good but failed final inspection/testing are also fed back into the machine learning system 310. This data may be used, based on the expert classification of the operator, and the final inspection real world data, to update the training data and update the VAV system 220.

In one embodiment, the system can also provide feedback about the accuracy of operators, based on the final inspection analysis.

In one embodiment, in another embodiment, the VAV system may replace the camera based inspection machine 210. Thus, the hardware of block 210 may be integrated into the VAV system of block 220. In some embodiments, the operator verification station 230 may be eliminated, when the machine learning system is sufficiently accurate. Thus, at its most basic the system includes hardware to perform camera-based inspection, and the advanced vision analytics verification system 220, trained by a machine learning system 310, with devices sent to repair if they are identified as failed, and passed to additional processes if they passed.

Figure 4:
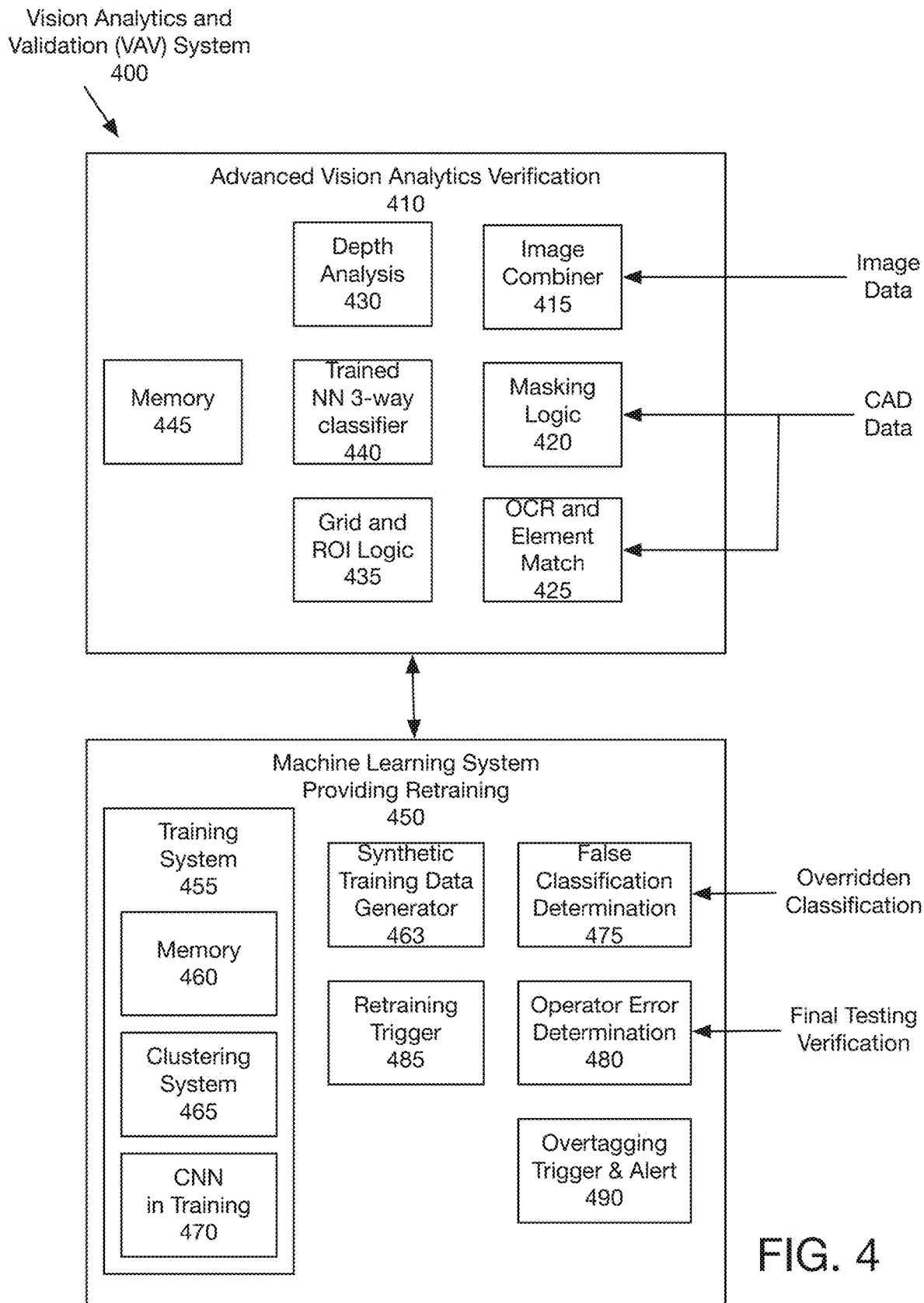
FIG. 4 is a block diagram of one embodiment of the Vision Analytics and Validation (VAV) System.

FIG. 4 is a block diagram of one embodiment of the Vision Analytics and Validation (VAV) System 400. Although the system is illustrated in two blocks, as advanced vision analytics verification 410 and machine learning system with retraining 450, one of skill would understand that this system may be implemented on a cloud-based system, on a single computer, or on one or more processors on one or more systems. In one embodiment, the system includes a computer system, as shown below in FIG. 10, which includes a processor implementing the analysis elements.

In one embodiment, the input to the advanced vision analytics verification 410 is image data from the inspection machine. In one embodiment, image data from multiple inspection machines, with various types of images, may be provided to the advanced vision analytics verification system 410.

An image combiner 415 in one embodiment combines the image data. In general the optical inspection machines take a number of images of each element, with different lighting conditions. In one embodiment, the optical inspection machines take images also from different angles. The optical inspection machines generally do not take images of the whole board, but rather of each identified element on the board. In one embodiment, the systems receive a number of images which are stitched together to get unified images. In another embodiment the system may analyze the images jointly, without creating a unified image. This is advantageous because it addresses the situation where the optical inspection machine is slightly misaligned, and takes a photo which does not include the entire element, or is at an off angle. Generally such misaligned or partial images would fail inspection because they do not match the sample images. However, by stitching together (or evaluating jointly) the set of images, the system can self-correct for misalignment.

In one embodiment, OCR and element matching 425 utilizes visual data in the image, and CAD data associated with the board to create a match, and identify the elements on the board. For integrated circuits there is often text on the top of the part, including information that may be used to determine the brand, part number, part type, etc. In one embodiment, OCR and element matching 425 extracts this data from the image, and associates it with the CAD data describing the configuration of the board. This allows the VAV system to have a better understanding of what the part is. In one embodiment, this may address the issue that arises from the substitution of a part to another part that appears visually different but provides the same functionality without causing erroneous "bad" classifications. For example, substitution of a capacitor from a different manufacturer, having the same specifications, would be less likely to be marked as "bad."

Grid and region of interest (ROI) logic 435 is used cut up the unified image into component images for inspection. In one embodiment, the "unified image" in this context is an assemblage of images aligned properly to each other to provide the equivalent of a single unified image. Thus, the grid and ROI logic 435 may create component images that include portions from multiple images taken by the inspection machine. In one embodiment, the system uses CAD data from OCR and element matching 425 and the unified image from image combiner 415 to create an accurate grid, which enables determining whether things are properly aligned, and also ensure that each image includes the region of interest. In some embodiments, in addition to doing component level analysis, the system may also create regions of interest that are sub-board level, not just component level. The grid and region of interest logic 435 uses the additional information available from the unified image and CAD analysis to create a more accurate region of interest window for analysis.

In one embodiment, grid and region of interest logic 435 provide improved board position calibration, by automatic board level localization/positioning or pose-determination. In one embodiment, the system may correct for variations in positioning in software via rotation/shifting of image, or in hardware by moving the physical board to match expectations.

In one embodiment, the grid and region of interest logic 435 may utilize a CAD-less part or feature discovery and localization. The system may identify parts or features on the board without CAD data by recognizing package types. In one embodiment, OCR and element matching 425 may be used. In one embodiment, the system can identify find pads, components, or other manufacturing objects (holes, vias, etc.), that can be used for creating region of interest windows. This may be particularly useful for testing boards where CAD isn't available, for example for a previously manufactured part that may not be working. This may also be used to accelerate and augment the CAD based approach.

Depth analysis 430 utilizes a series of images, which may include depth images, normal images, multi-dimensional images, surface normal images, multi-spectral images, and X-ray images at multiple depths, to create one or more images with a stacked depth of field (DOF). In one embodiment, X-rays at different depths of field may be combined to create a combined in-focus image. In one embodiment, this may be done based on frequency analysis to identify component edges. The images together can create a "depth image" which enables matching of the 3D shape and depth of solder and/or elements to ensure they are properly attached to the board. This can detect lifted components, and other difficult to identify issues.

Once the window for the region of interest is identified, other elements within the window that aren't of interest can be masked by masking logic 420. In one embodiment, data from the CAD file is used, because the CAD data includes information about silk screen lettering/nearby components. This data is used to mask out "expected elements" which are not relevant to this region of interest analysis, e.g. everything outside the device & its pad. By masking the background better, the classifier can be more accurate because it is less likely to be impacted by erroneous/irrelevant data.

Trained classifier 440 utilizes the identified ROI to classify each component as good, bad, or don't know. In one embodiment, the classifier 440 is a trained neural net three-way classifier. In one embodiment, the neural net is a convolutional neural net (CNN). In one embodiment, the system generates a classification of good or bad, and attaches a probability to the classification. If neither probability is over a threshold, in one embodiment 95%, the component is classified as "do not know." It is expected that as the number of data sets seen increases, the percentage of "do not know" classifications will drop.

In one embodiment, the trained classifier 440 is able to transfer learning between different package types. Some types of inspections apply generally to components, e.g. solder quality is relevant to most elements on a board. Some aspects are specific to the component, e.g. bulging capacitors are relatively unique, and other components do not have comparable deformations. In one embodiment, the system is trained to be able to generalize beyond a specific part, for aspects which are general. Similarly, in one embodiment, the learning transfers between different boards and products. This enables a smaller set of training images because many of the training images used may come from different boards, or different parts.

In one embodiment, the trained classifier 440 can extend its detection to new defect types without needing explicit training for the new defect. There are many ways that an assembly can be bad but only very specific ways that an assembly can be good. Deviations from good cases are usually bad, and learning anomaly detection allows the system to extend its identification to previously unseen defects. By clustering "good" determinations with statistical variations that are still good, the system can set all features which do not fit within the good determination and its accepted variations as not good, i.e. bad. The system need not determine how" or "why" it is bad. This type of anomaly detection is useful to identify new defect types, without requiring retraining.

Because of such clustering, the system is also robust to environmental conditions, changes in lighting and position. This means that the system should have no or minimal environmental-change based failures in classification.

Memory 445 in one embodiment stores the classifications, which are passed to both the next processing system and the machine learning system 450. In one embodiment, boards which include one or more elements classified as bad are sent to the operator for validation, as noted above. In one embodiment, boards are provided to the operator with an indication of what element(s) were identified as bad. Boards classified as "do not know" are also sent to the operator for validation. In one embodiment, the issues flagged by the VAV system are identified to the operator. In another embodiment, the element(s) flagged are not provided to the operator, to keep from prejudicing the manual reviewer.

The machine learning system providing retraining (MLR) 450 is the system that creates the trained classifier 440. In one embodiment, the training system 455 creates and updates the CNN in training 470, which is used to update the trained convolutional neural network classifier 440 of the advanced vision analytics verification 410.

The training system 455 includes memory 460 with training and testing data, clustering system 465, and a convolutional neural network (CNN) in training 470. The CNN in training 470 is initially trained with training data, and tested with testing data. In one embodiment, the CNN in training 470 is subsequently retrained with new data obtained from the classifier 440, overridden classification, and final testing verification data. In one embodiment, retraining is triggered by trigger 485, when the system either accumulates enough data, or has an error rate above a threshold. In one embodiment, retraining is continuous as new data comes in from the real-world expert tagging (operators). In one embodiment, the annotations provided by the human operators, on boards analyzed as bad by the VAV system and evaluated by the operators, are used to continuously retrain the CNN in training 470. In one embodiment, the training 3-way classifier 440 is updated with the data from CNN in training 470 periodically. In one embodiment, the updating is continuous, when the CNN in training has received additional data, and is more accurate than a prior version. In one embodiment, the updating occurs periodically, regardless of whether new training data has been added to the system. In one embodiment, the updating is initiated manually.

In one embodiment, the training system 455 uses weakly supervised learning, in which the only determination made by the CNN in training 470 is whether the component is good or bad. The training data uses "good/bad" tagged images of many situations from many boards to train the CNN in training 470. With enough examples, the CNN in training 470 learns what makes something good or bad. For example, the system will "learn" about solder volume, part positioning, what to ignore (such as lettering), part presence/absence, etc. The system, in one embodiment, uses training data from outside the board family, and with variations of particular component/package types, across boards and package types, across companies, to fully generalize without requiring new work when a new product/board/component is introduced. Instead of a hand curated decision process, with all features specifically modified/specified, the system creates features automatically and classifies based on cumulative evaluation. This reduces the need for expertise in the people training the system.

Clustering system 465 in one embodiment clusters the elements identified as good and their statistical variations, which enables a simpler classification. By deeming everything outside the cluster of elements identified as good and its variations as bad, the system can extend its analysis to new defect types without needing training examples of the new defect specifically.

False classification determination 475 provides feedback on the boards which the system deemed as bad, and the operator deemed as good. It utilizes the data from the VAV system, and data from the overridden classification from the operator. This data, in one embodiment, is used to retraining the CNN 470. In one embodiment, however, the overridden classification is only used in training after the final testing verification confirms the operator's decision. That is, if the operator overrides the VAV system classification, but the final inspection indicates that the board was indeed bad, the operator's classification is not used in retraining.

In one embodiment, operator error determination 480 uses the final testing verification data to validate the operator decisions on boards which the VAV classified as bad or do not know. In one embodiment, the "golden truth" is the final inspection, which determines whether the end board is good or not. In one embodiment, when a board fails the final test, the operator error determination logic 480 attempts to walk back the process, to figure out if the VAV system identified the board as bad or not known, and a human cleared it as good. If the board was identified as bad or do not know by the VAV system, in one embodiment, the system identifies the individual operator that overrode the classification and passed this particular board. The operator error determination 480, in one embodiment, over time learns to identify the error rates of different operators. In one embodiment, the system may override a particular operator when they seem to make wrong determination on certain errors. In one embodiment, the system may trigger an alert recommending retraining of the operator, if a certain number of errors are found. In one embodiment, each operator may be rated over time, and operators below a certain rating may be retrained or otherwise corrected.

Overtagging trigger and alert 490 utilizes statistical data on the output of the trained classifier 440, to determine poor performance by the system. The overtagging trigger and alert 490 can detect that the system is producing detections of poor quality. In one embodiment, when more than a certain percentage of boards identified as bad are good, that is considered bad performance. In one embodiment, if more than 10% of the boards tagged bad are identified by the operator as good, and confirmed as good, the overtagging trigger and alert 490 considers that overtagging. In one embodiment, the percentage may be set between 90% and 10%. In one embodiment, the percentage may be adjusted higher for a new board, and lowered over time, as the CNN is trained with more data. In one embodiment, for boards identified as "not known" there is no overtagging rate. In another embodiment, the overtagging rate may be 90%, e.g. when more than 90% of boards identified as "unknown" are good, it may be considered overtagging.

In one embodiment, the overtagging trigger and alert 490 may alert the line operator or take another action, when overtagging (or poor quality detection) is identified. In one embodiment, the current results are matched to previous processes to identify what issue is occurring, and to match the detected error to the process step. In one embodiment, an informative alert is provided.

In one embodiment, if a recent retraining results in poor quality, the system may roll back such retraining, e.g. restore a prior (better quality) version of the trained classifier 440. In one embodiment, such an error may occur if bad data is inserted into the training/retraining data set. In one embodiment, the ability to restore an earlier version is maintained by maintaining versioning for the CNN in training.

In one embodiment, synthetic training data generator 463 can generate synthetic training data by generalizing data from a set of existing training data. For example, in one embodiment, synthetic training data generator 463 may remove the circuit element from a viewing window and create "solder ball"-only synthetic training data. In one embodiment, synthetic training data generator 463 may create training data based on the clustering of good elements and their variations. Thus, training data may be created that encompasses variations that have not actually been seen by the system, but rather are within the scope of variations that are identified in the cluster.

In this way, the VAV system 400 provides an enhanced second-look prior to requiring human input for evaluating the quality of elements on a board. This process may also be used for identifying problems in any type of inspection, including scratches, missing screws, assembly type errors. Furthermore, although the term "board" and "component" were used in the description, one of skill in the art would understand that this may be extended to any type of visual inspection of assembled systems, whether boards/components, boxes/packaging, built parts having multiple components, etc.

Figure 5:
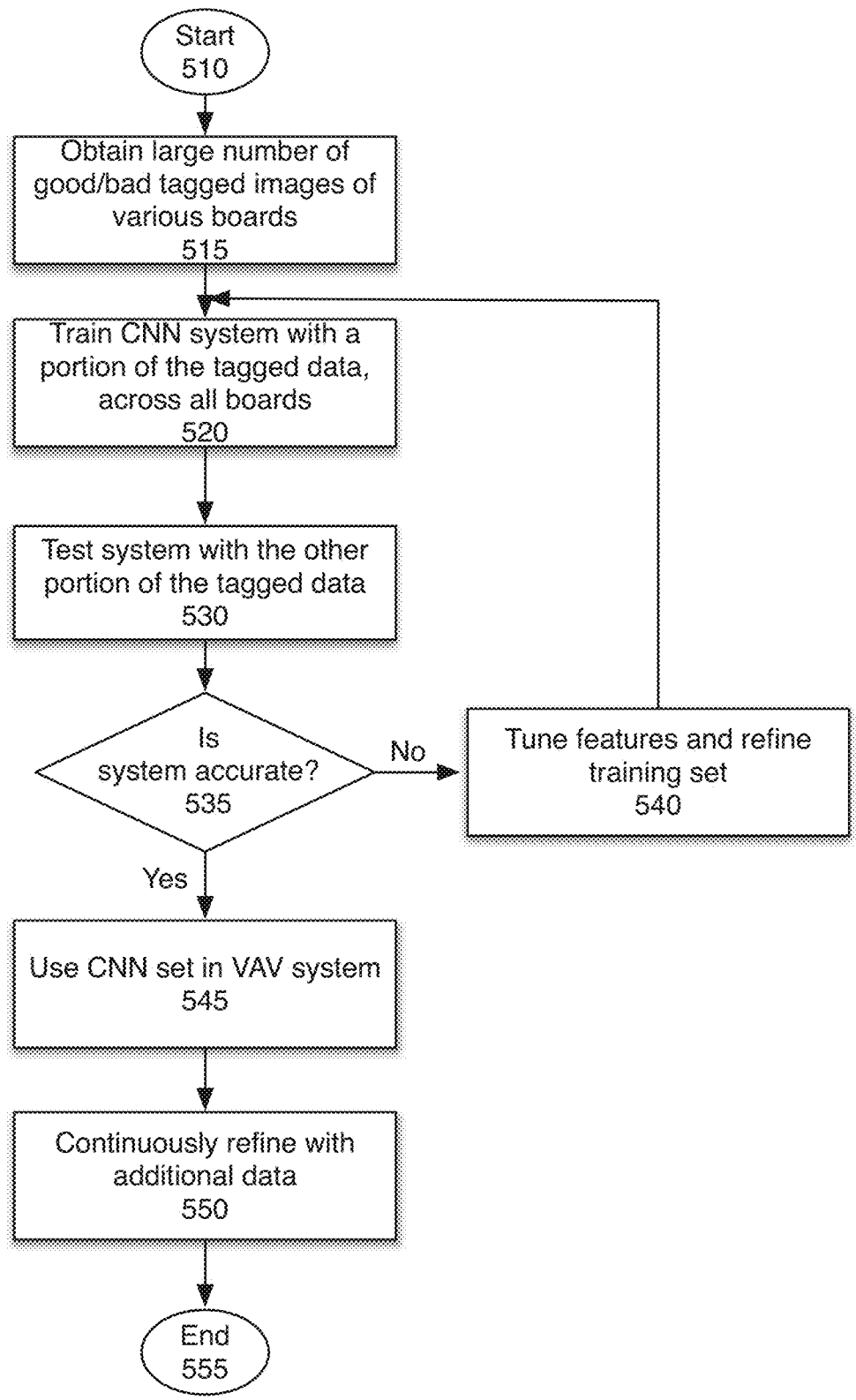
FIG. 5 is an overview flowchart of setting up and training a VAV system.

FIG. 5 is an overview flowchart of setting up and training a VAV system. The process starts at block 510.

At block 515, the system obtains a large number of tagged images of various boards. This data, in one embodiment, is tagged by experts and verified as accurate.

At block 520, the convolutional neural network (CNN) is trained with a portion of the tagged data, across all boards.

At block 530, the system is tested with the remaining portion of the tagged data.

At block 535, the process determines whether the system is accurate. In one embodiment, the system is expected to have a low level of false positives (items marked as bad that are good) and a low level of false negatives (items marked as good that are bad). As noted above, the system does have a third classification, which is "do not know." In one embodiment, if there are more than 5% false positives, or 5% false negatives, or 5% do not know classifications, the system is deemed not sufficiently accurate.

If the system does not have an appropriate level of accuracy, the features are tuned, and the training set is refined, at block 540. The process then returns to block 520 to retrain the CNN. In one embodiment, additional data is added to the training set if necessary.

Once the system is deemed sufficiently accurate, at block 535, the process continues to block 545.

At block 545, the trained CNN is provided to the VAV system. As noted above, at block 550, in one embodiment, the CNN is continuously refined with additional data, as the system provides real world data. For real world data, in one embodiment, the "expert classification" is provided by the final inspection and testing, which determines whether the board output is in fact good, coupled with the VAV classification and the human operator review data. The process then ends at block 555.

Figure 6:
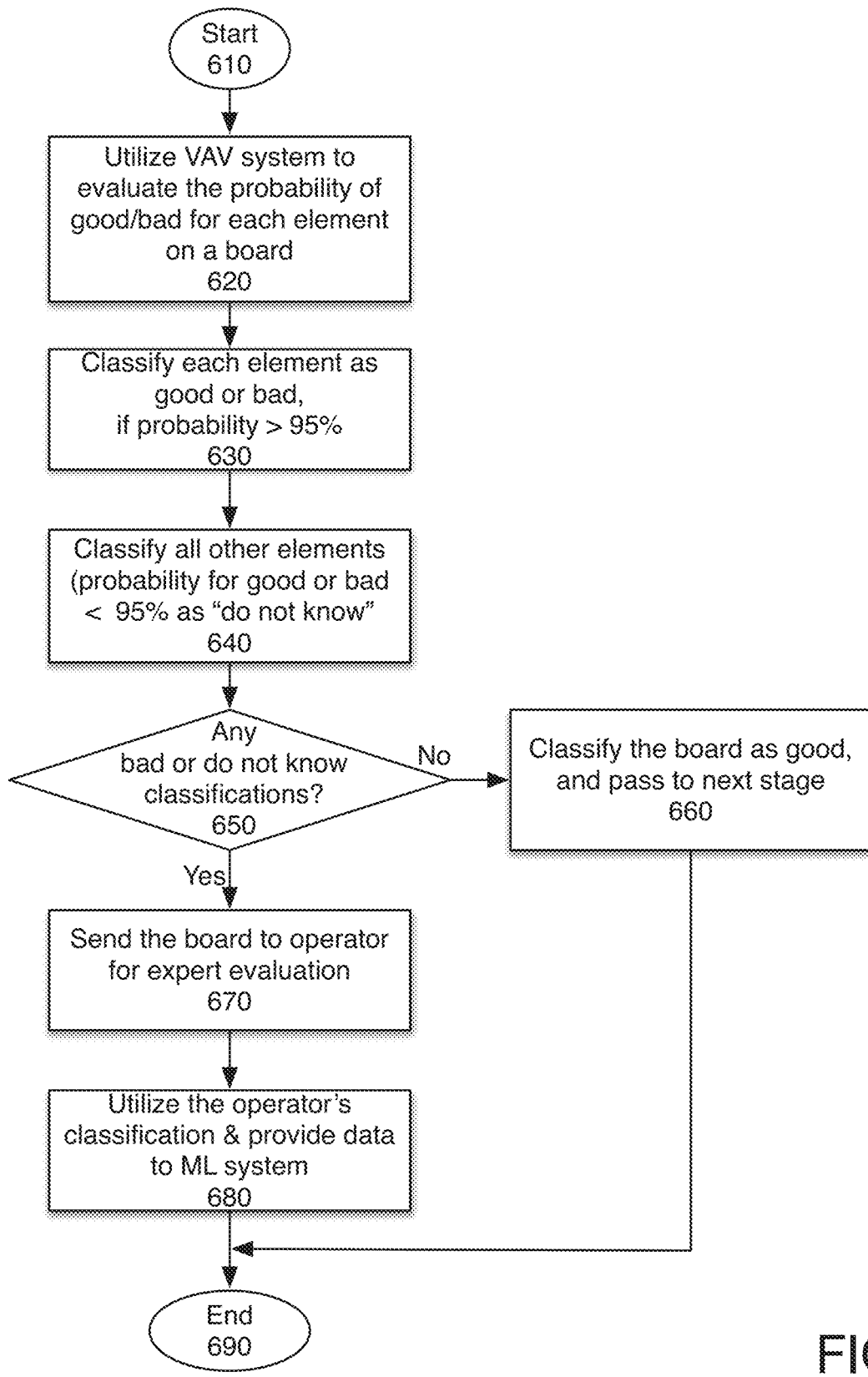
FIG. 6 is a flowchart of one embodiment of using a three-way classifier.

FIG. 6 is a flowchart of one embodiment of using a three-way classifier. Generally CNN classifiers are two-way classifiers, identifying items either as good or bad. However, the present application utilizes a three-way classifier. By assigning a probability to each classification, and identifying any potential classification below the threshold as "do not know," the system can create a more accurate end result. The process starts at block 610.

At block 620, the VAV system is used to evaluate the probability that an element on the board is good or bad. In one embodiment, this evaluation is done separately for each element. In one embodiment, the classifier identifies the element and assigns a probability that it is good, and a probability that it is bad. In one embodiment, the probabilities add up to 100%, e.g. an element that is 98% good, has a 2% probability that it is bad.

At block 630, all elements that have a probable classification over a certain percentage are classified to their probable classification. For example, if the probability that an element is good (or bad) is over 95%, then the element is classified as good (or bad). In one embodiment, the decision threshold is between 80% and 98%. In one embodiment, the decision threshold for a valid good or bad classification may be set by the user.

At block 640, all elements which are below the threshold percentage are classified as "do not know." That is, any element which is not reasonably certain to be good or bad, is classified as "do not know."

At block 650, after all of the elements on the board have been individually evaluated, the system determines whether the board includes any bad or do not know classifications. As noted above, the classification process is run for each of the elements on the board. If the board has no bad or do not know classifications, at block 660, the board is classified as good, and passed to the next stage, and the process ends.

If there is at least one bad or do not know classification, the process continues to block 670.

At block 670, the board is sent to the operator for expert evaluation. At block 680, the operator's classification is used. In one embodiment, the operator's classification is then provided to the machine learning system for training. In one embodiment, the data is not used for training until it is validated by the final inspection, if it is classified as good by the operator. In one embodiment, if the operator confirms the VAV system's classification as bad, or indicates that a do not know classified element is bad, this data is also provided to the machine learning system for training. The process ends at block 690.

Figure 7A:
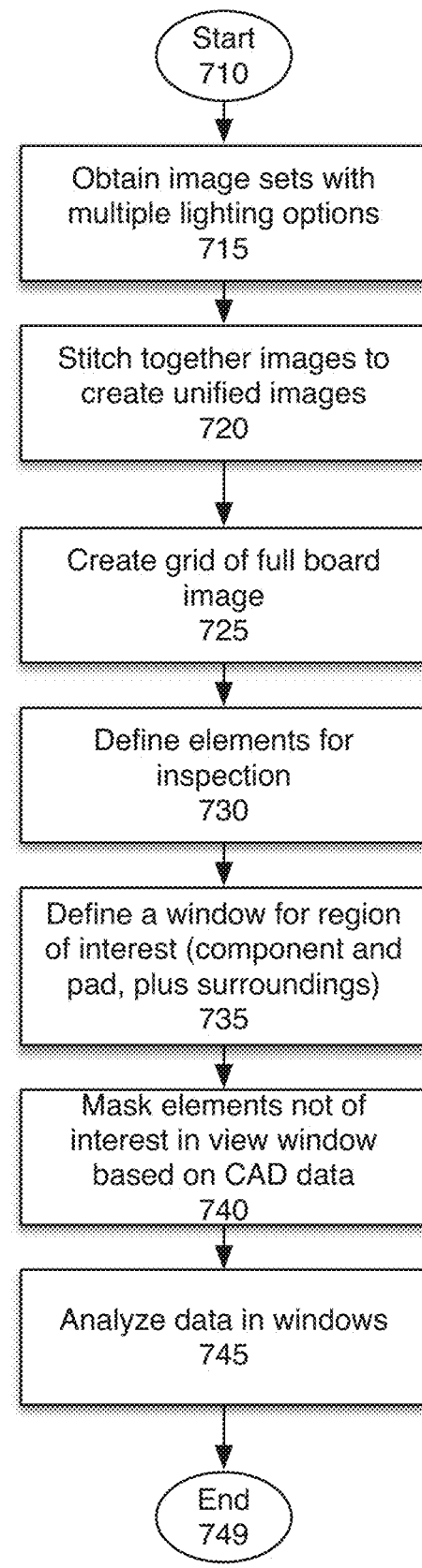
FIG. 7A is a flowchart of one embodiment of region of interest definition, including masking.

FIG. 7A is a flowchart of one embodiment of region of interest definition, including masking. The process starts at block 710.

At block 715, image sets with multiple lighting options are obtained. In one embodiment, one or more camera-based inspection machines are used to obtain images. In one embodiment, the lighting options may include multiple colors, multiple angles of lighting, etc.

At block 720, the images are stitched together to create unified images. In one embodiment, this is done at the board level, e.g. creating an representation of the board, with a layered image. In another embodiment, this is done at the element level, creating representation of the element with the layered set of images. This representation can also be referred to as "a unified image." In one embodiment, this unified image includes multiple layers of images based on the multiple lighting options.

At block 725, a grid of the full board image is created. The grid is based on the stitched together images of the multiple elements of the board. In one embodiment, the grid may also be based on the CAD data for the board. In one embodiment, the images may be overlaid the CAD base, to ensure proper alignment of the images.

At block 730, the elements are defined for inspection. On a board, there may be dozens or even thousands of separate elements, each of which are inspected by the system. Each separate circuit component, such as a resistor, capacitor, integrated circuit, or other component is separately inspected to ensure that it is correctly placed and attached. The attachment may be via solder, surface mounting, wrap, or other mechanism.

At block 735, a window is defined for each region of interest. The region of interest includes the circuit component, or element, and the pad to which it is attached. In one embodiment, each circuit element is attached to the board at one or more points. In general, these points are either vias (holes in the circuit board) or pads, to which the element is coupled. The element and its attachment are considered the window for the region of interest. In some embodiments, there may also be global regions of interests which inspect areas not associated with any elements, such as traces on the board.

At block 740, the elements which are not of interest in the window are masked. This may include elements such as lettering on the integrated circuit or component, portions of other elements and their attachment, which may be within the window, etc. In one embodiment, the masking may be based on CAD data. The CAD data shows the board layout, including lettering, and that data may also be used for masking.

At block 745, the element in the region of interest is analyzed. In one embodiment, the inspection process described above with respect to FIGS. 5 and 6 may be used, to classify the element as either good, bad, or do not know. The process then ends at block 749.

Figure 7B:
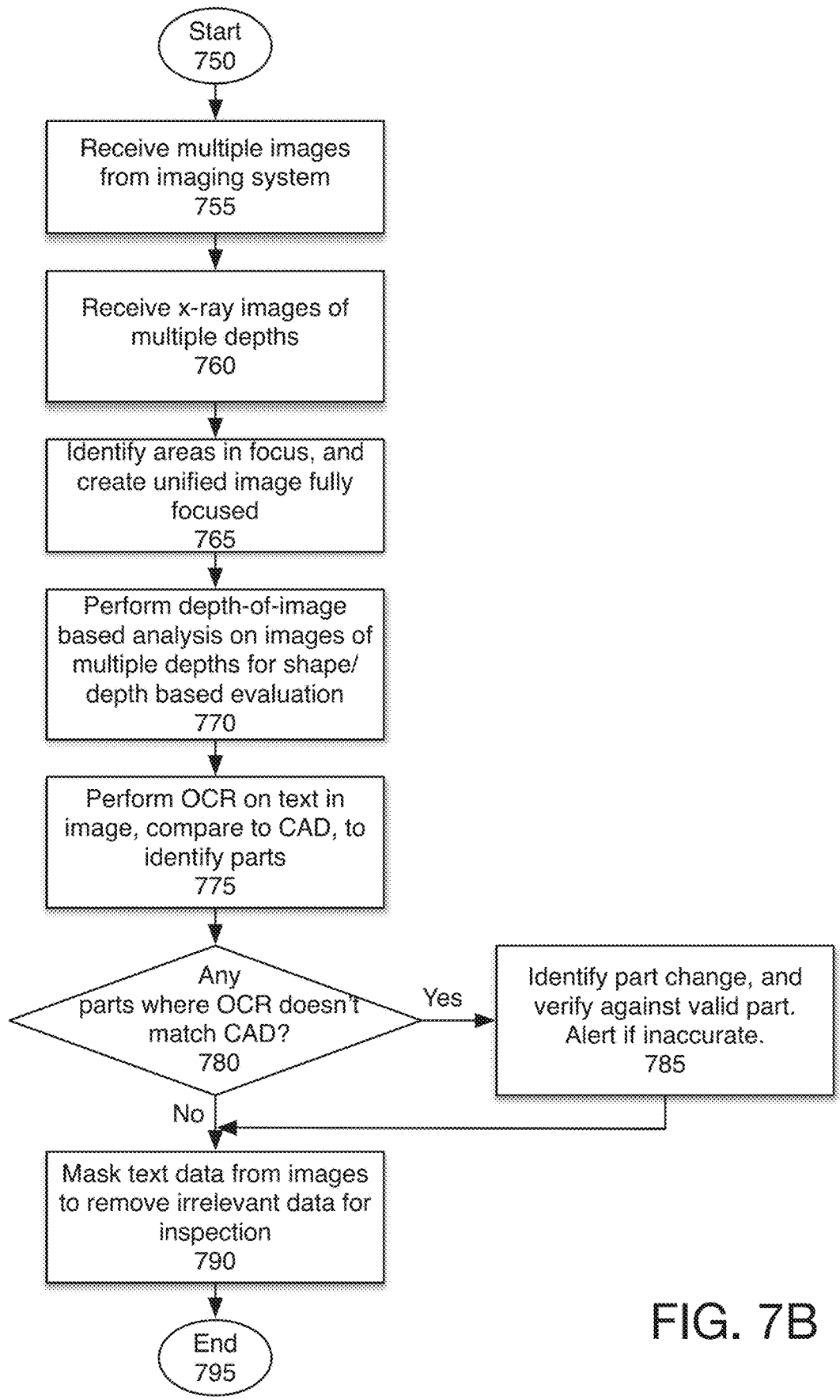
FIG. 7B is a flowchart of one embodiment of generating the board image.

FIG. 7B is a flowchart of one embodiment of generating the board image. The process starts at block 750.

At block 755, the system receives multiple images from an imaging system. In one embodiment, the images may be from different angles, and with different lighting.

At block 760, the system receives X-ray images of multiple depths. In one embodiment, the X-ray imaging machine images are used.

At block 765, the areas of focus are identified for the images, and a unified image is created, based on the multiple images. In one embodiment, the unified image may include image portions at different depths. In one embodiment, the multiple images are combined to have each in focus. In one embodiment, the various images are aligned to create a unified image, but no actual separate unified image is created. Rather a set of properly aligned images together are considered as a unified image.

At block 770, a depth-of image based analysis is performed. The depth of image based analysis evaluates the shape and layers of the element imaged. This enables the identification of problems such as lifted solder, which are not visually identifiable based on an image from above.

At block 775, any text in the image is analyzed using optical character recognition (OCR). In one embodiment, the OCR'd data may be matched to the CAD data. In one embodiment, the parts are identified based on the OCR'd data, the CAD data, or a combination of the OCR and CAD data.

At block 780, if OCR and CAD data analysis is used, the process determines whether are any parts where the OCR does not match the CAD data. If so, at block 785, the process determines whether there was a part change, e.g. whether the OCR data indicates a substitute part that matches the CAD part. If the system cannot identify such a part change, an alert is triggered.

If there are no mismatches, or the mismatch is resolved by identifying a part change, at block 790 the text data is masked for the images to remove irrelevant data for the VAV system's analysis. The processed and masked data is provided to the VAV for analysis. In one embodiment, the analysis is performed as described above with respect to FIGS. 5 and 6. The process then ends at block 795.

Figure 8:
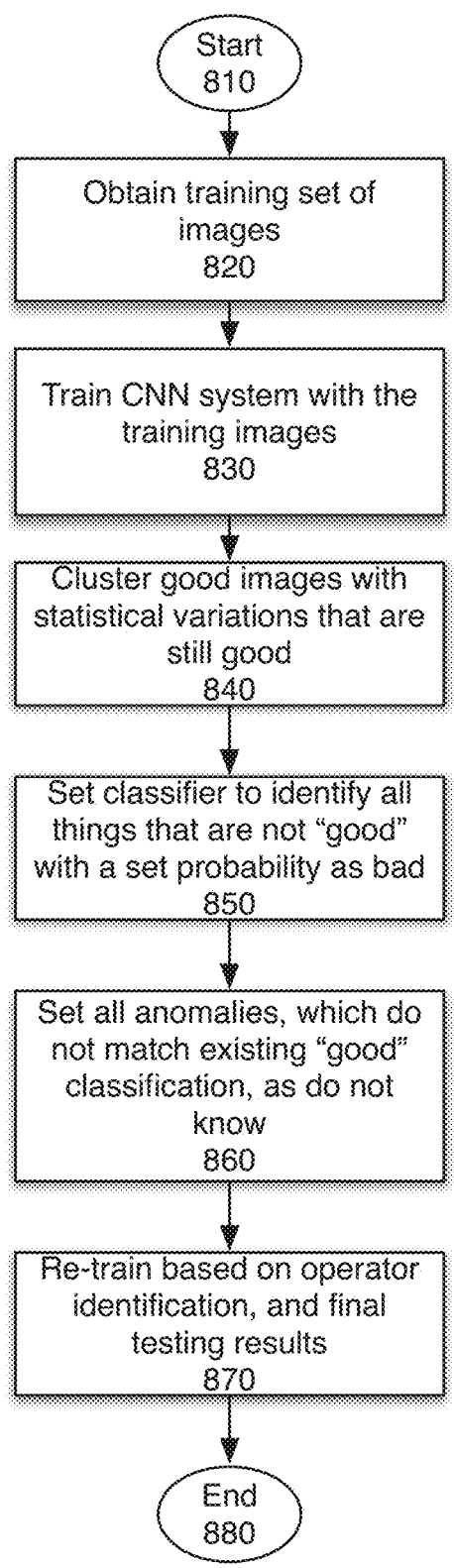
FIG. 8 is a flowchart of one embodiment of clustering statistical variations, to enable extension to new defect types.

FIG. 8 is a flowchart of one embodiment of clustering statistical variations, to enable extension to new defect types. The process starts at block 810.

At block 820, a training set of images is obtained. In one embodiment, the training set includes a plurality of images with expert classified good and bad elements. In one embodiment, the training set includes the multiple types of "bad" elements which the system is designed to identify.

At block 830, the CNN system is trained on the training images. While the CNN system is set to classify into three categories (good, bad, and do not know), the training includes only good and bad images.

At block 840, a statistical model is fitted to the good images in the training data, which uses their statistical properties to form a cluster. The purpose of this clustering is to provide the "range" of "good" versions of a particular element.

At block 850, the model recognizes bad images based on the distance of the "bad" images from the statistical properties of the good images cluster. The user can set the distance threshold from the good images cluster that determines when the system starts determining an image as bad.

At block 860, anomalies which do not match existing good classifications, are set as "do not know." In one embodiment, anomalies are configurations which match neither the images classified as good, nor the images classified as bad. The board which include elements which are classified as bad or do not know are sent to an operator for review, as discussed above.

At block 870, the system is re-trained, based on the operator identification and final testing results. In one embodiment, the operator may, in addition to marking a "do not know" classified element as good, indicate the source of the anomaly. For example, if an element is replaced, the system may indicate that as an anomaly. The operator may indicate that the board is good, and also that the replacement is what triggered the do not know classification. This enables faster retraining, because the cause of the issue is identified. In one embodiment, retraining may be triggered immediately for such scenarios. In one embodiment, retraining may only be triggered after data from certain number of reviewed boards are available. The process then ends at block 880.

Figure 9:
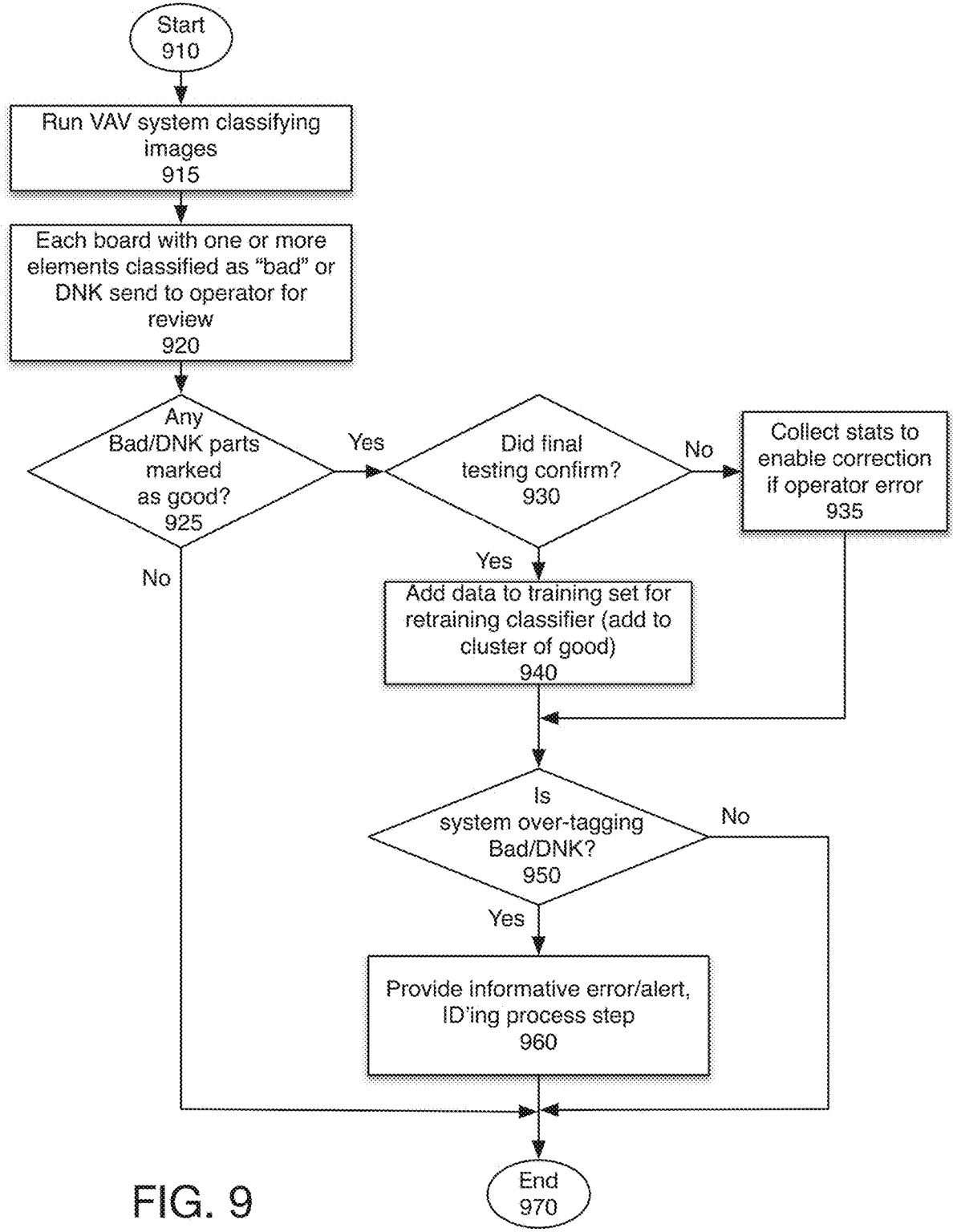
FIG. 9 is a flowchart of one embodiment of the fast feedback and retraining loop.

FIG. 9 is a flowchart of one embodiment of the fast feedback and retraining loop. The process starts at block 910.

At block 915, the VAV system classifies the images. As noted above, the classification for each element is good, bad, or do not know (DNK).

At block 920, for each board which has one or more elements classified as bad or do not know, the system sends it to an operator. The operator can confirm a bad classification or change it to good, and can either classify a do not know as a good or bad board.

At block 925, the process determines whether any bad or do not know classified boards were marked as good by the operator. This means that the operator disagreed with the classification. If the operator concurs that the part is bad (whether it was marked bad or do not know), the process ends at block 970. In one embodiment, such confirmed bad elements may be added to the training data.

If the operator disagrees, and marks the part as good, the process continues to block 930. At block 930 the process determines whether the testing confirmed the operator's marking. In one embodiment, the testing at the end of the assembly process ensures that the board is in fact good. Although the testing may find a board bad for reasons that an operator could not have identified—for example one of the components is non-functional which cannot be determined by visual inspection even by an expert—the system in one embodiment relies on this final validation to confirm the operator's override.

If the final testing found the part to be bad, at block 935, in one embodiment the data is added to statistics collected about the operators. In one embodiment, the final testing may confirm that the board is bad because of an error that should have been identified (or the error which was identified by the VAV system but overridden by the operator). If that is the case, there may be operator retraining. However, in general, the final testing only reports whether the board passes or not. In that case, it is merely statistically relevant whether a significant portion of the overrides by the operator are found to be bad boards.

If the final testing confirmed that the operator was correct and the board was good, at block 940, the data from the board is added to the training set for the classifier. Over time, such additions expand the cluster of appearances which are classified as good. The process then continues to block 950.

At block 950, the process determines whether the system is overtagging bad and/or do not know classifications. In one embodiment, if the number of parts which are classified as bad or do not know, and are overridden by an operator, is above a threshold, it is considered overtagging. In one embodiment, the threshold is 3-5%. In another embodiment, the threshold is between 1% and 10%. If the system is overtagging, in one embodiment at block 960, an informative error/alert is provided, identifying the process step which is causing the erroneous classifications. This may be used as a trigger to retrain the classifier, or to tweak the probability ranges used for classification. The process then ends, at block 970.

Figure 10:
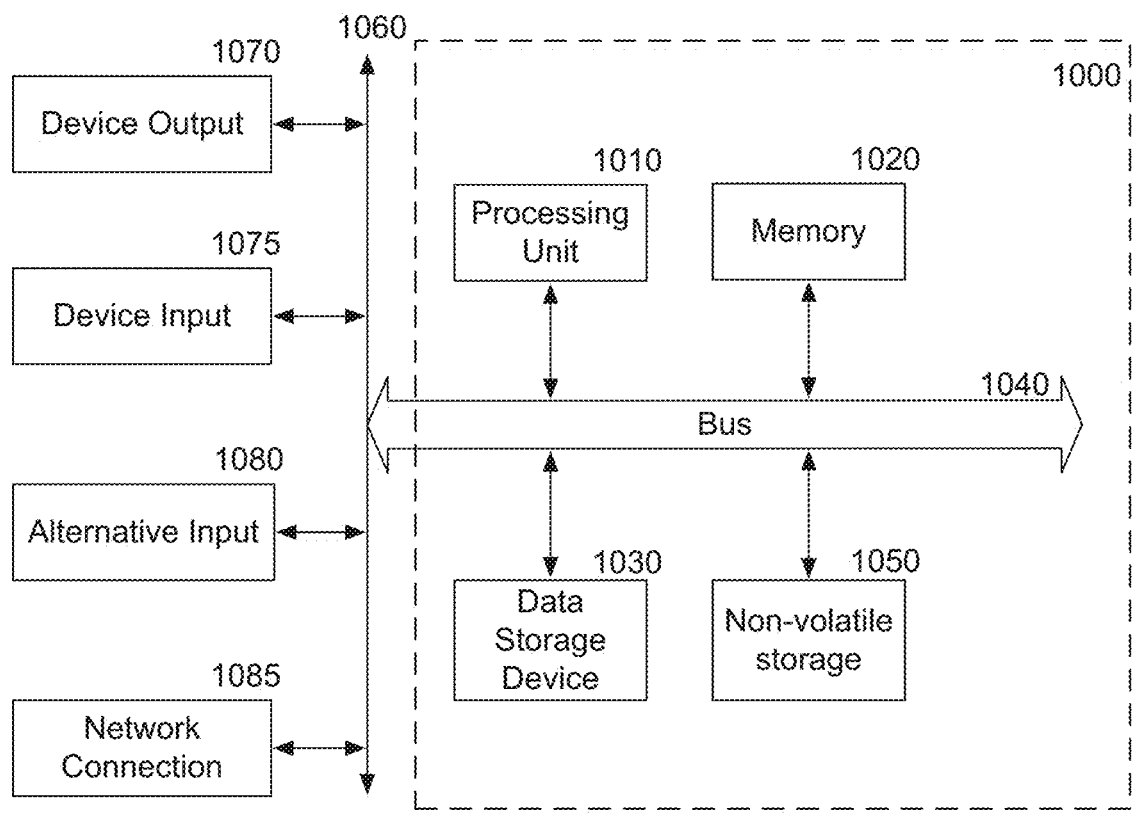
FIG. 10 is a block diagram of a computer system which may be used with the present application.

FIG. 10 is a block diagram of one embodiment of a computer system that may be used with the present invention. It will be apparent to those of ordinary skill in the art, however that other alternative systems of various system architectures may also be used.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment, the system also includes a data storage device 1030 such as a magnetic disk or optical disk and its corresponding disk drive, or Flash memory or other storage which is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.)

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is cursor control device 1080, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1040, the processor 1010, and memory 1050 and/or 1020.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A vision analytics and validation (VAV) system for providing an improved inspection of robotic assembly, the VAV system designed to quickly adapt to new defects, new lighting conditions, and new parts without requiring tuning, the VAV system comprising:
   a processor implementing a trained neural network three-way classifier, to classify each component as good, bad, or do not know;
   an operator station configured to enable a human operator to review an output of the trained neural network three-way classifier, and to determine whether a board including one or more "bad" or a "do not know" classified components pass review and is classified as good, or fails review and is classified as bad;
   a clustering system to implement a clustering model wherein a cluster of data defining "good" components is build using statistical features of the "good" components, and wherein an object which is not within the cluster of data is classified as bad;
   a synthetic training data generator to create synthetic training data based on the cluster of data, representing elements within the cluster of data that do not occur in training data.

2. The VAV system of claim 1, further comprising:
   an image combiner to combine a plurality of images from one or more camera-based inspection machines, the image combiner to create a unified image;
   a grid and ROI logic to divide the unified image into regions of interest including an element and associated pads;
   an OCR and element match to identify elements on the board based on optical recognition;
   a masking logic to mask extraneous information within a viewing window, prior to passing data to the trained neural network three-way classifier.

3. The VAV system of claim 1, further comprising:
   a machine learning system to train the trained neural network three-way classifier, the machine learning system training the neural network three-way classifier with data from the synthetic training data generator, the human operator, and a final inspection, enabling the VAV system to rapidly adapt to new defects, new lighting conditions, and new parts.

4. The VAV system of claim 1, wherein the synthetic training data generator uses CAD files to create synthetic images of "good" and "bad" components with tags.

5. The VAV system of claim 4, wherein one or more of the synthetic training data comprises only isolated subparts of the components.

6. The VAV system of claim 5, wherein the isolated subparts comprise solder balls isolated from other parts of a circuit element.

7. The VAV system of claim 1, further comprising:
   the synthetic training data generator use a focused subset of the training data to generate the synthetic training data, the focused subset comprising the training data with portions that not relevant to the inspection masked out.

8. The VAV system of claim 7, further comprising:
   a masking logic to utilize CAD data about the component to match elements on a combined image and mask the portions that are not relevant to the inspection.

9. A system for providing an improved inspection comprising:
   a processor implementing a trained neural network three-way classifier, to classify each component as good, bad, or do not know;
   an operator station to enable an operator to verify an output of the trained neural network three-way classifier and to verify a classification of at least a subset of components;
   a clustering system to implement a clustering model wherein a cluster of data defining "good" components is build using statistical features of the "good" components, and wherein an object which is not within the cluster of data is classified as bad;
   a synthetic training data generator to create synthetic training data based on the cluster of data, representing elements within the cluster of data that do not occur in training data.

10. The system of claim 9, further comprising:
    the operator station configured to enable a human operator to review the output of the trained neural network, and to verify whether a board including one or more "bad" or a "do not know" classified components passes review and is classified as good or fails review and is classified as bad.

11. The system of claim 9, wherein the synthetic training data generator uses CAD files to create synthetic images of "good" and "bad" components with tags.

12. The system of claim 9, wherein one or more of the synthetic training data comprises only isolated subparts of the components.

13. The system of claim 12, wherein the isolated subparts comprise solder balls isolated from other parts of a circuit element.

14. The system of claim 9, further comprising:
    the synthetic training data generator use a focused subset of the training data to generate the synthetic training data, the focused subset comprising the training data with portions that not relevant to the inspection masked out.

15. The system of claim 14, wherein the masking out utilizes optical character recognition to identify and mask out writing.

16. The system of claim 14, further comprising:
    a masking logic to utilize CAD data about a component to match elements on a combined image and mask the portions that are not relevant to the inspection.

17. A method for providing an improved inspection of robotic assembly comprising:
    classifying each component as good, bad, or do not know, using a processor implementing a trained neural network three-way classifier;
    providing an output the trained neural network three-way classifier to an operator station to verify a classification of at least a subset of components;
    clustering data to build up a cluster of data defining "good" components using statistical features of the "good" components, and wherein an object which is not within the cluster of data is classified as bad;
    creating synthetic training data based on the cluster of data, representing elements within the cluster of data that do not occur in training data.

18. The method of claim 17, further comprising:

enabling a human operator to review the output of the trained neural network three-way classifier and to verify whether a board including one or more "bad" or "do not know" classified components passes review and is classified as good, or fails review and is classified as bad at the operator station.

19. The method of claim 17, wherein the synthetic training data is generated using CAD files to create synthetic images of "good" and "bad" components with tags.

20. The method of claim 18, wherein one or more of the synthetic training data comprises only isolated subparts of the components.

* * * * *